United States Patent
Suthar et al.

(10) Patent No.: US 10,673,618 B2
(45) Date of Patent: *Jun. 2, 2020

(54) PROVISIONING NETWORK RESOURCES IN A WIRELESS NETWORK USING A NATIVE BLOCKCHAIN PLATFORM

(71) Applicant: Cisco Technology, Inc., San Jose, CA (US)

(72) Inventors: Om Prakash Suthar, Bolingbrook, IL (US); Ammar Rayes, San Ramon, CA (US); Michael David Geller, Weston, FL (US); Ian McDowell Campbell, Littleton, CO (US); Aeneas Sean Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,950

(22) Filed: Oct. 15, 2018

(65) Prior Publication Data

US 2019/0379544 A1    Dec. 12, 2019

Related U.S. Application Data

(60) Provisional application No. 62/682,778, filed on Jun. 8, 2018.

(51) Int. Cl.
*H04L 29/06* (2006.01)
*H04L 9/06* (2006.01)
(Continued)

(52) U.S. Cl.
CPC ........ *H04L 9/0637* (2013.01); *G06F 9/45558* (2013.01); *G06Q 20/065* (2013.01);
(Continued)

(58) Field of Classification Search
CPC ................... H04L 9/32; G06Q 20/06
(Continued)

(56) References Cited

U.S. PATENT DOCUMENTS

| 4,236,068 A | 11/1980 | Walton |
| 5,642,303 A | 6/1997 | Small et al. |

(Continued)

FOREIGN PATENT DOCUMENTS

| CN | 107784748 A | 3/2018 |
| WO | WO 2013/020126 | 2/2013 |

(Continued)

OTHER PUBLICATIONS

"Cisco ASR 5x00 Mobility Management Entity Administration Guide," Version 15.0, Cisco Systems, Inc., Last updated Jun. 13, 2014, pp. 1-266.

(Continued)

*Primary Examiner* — Evans Desrosiers
(74) *Attorney, Agent, or Firm* — Polsinelli PC

(57) ABSTRACT

A Network Function (NF) entity in a telecommunication network receives blockchain credentials associated with UE and selects a Blockchain Charging Function (BCF). The NF entity further generates a Charging Data Record (CDR) corresponding to network resources, and sends a charging request based on the CDR (and policy rules) to the BCF entity over a blockchain network interface. The BCF entity sends a confirmation of the charging request, and the NF entity, based on the confirmation, provisions the network resources to the UE.

15 Claims, 7 Drawing Sheets

(51) Int. Cl.

| | | |
|---|---|---|
| H04W 12/06 | (2009.01) | |
| H04W 12/08 | (2009.01) | |
| G06Q 20/40 | (2012.01) | |
| G06Q 20/32 | (2012.01) | |
| H04W 60/00 | (2009.01) | |
| G06Q 20/36 | (2012.01) | |
| G06Q 20/10 | (2012.01) | |
| G06Q 20/38 | (2012.01) | |
| G06Q 20/06 | (2012.01) | |
| H04L 9/32 | (2006.01) | |
| G06F 9/455 | (2018.01) | |
| H04L 9/08 | (2006.01) | |
| H04L 9/30 | (2006.01) | |
| H04L 12/911 | (2013.01) | |
| H04W 8/02 | (2009.01) | |
| H04W 88/02 | (2009.01) | |
| H04W 8/18 | (2009.01) | |
| H04W 60/04 | (2009.01) | |

(52) U.S. Cl.
CPC ............ *G06Q 20/10* (2013.01); *G06Q 20/322* (2013.01); *G06Q 20/325* (2013.01); *G06Q 20/36* (2013.01); *G06Q 20/389* (2013.01); *G06Q 20/40* (2013.01); *G06Q 20/401* (2013.01); *G06Q 20/403* (2013.01); *H04L 9/083* (2013.01); *H04L 9/30* (2013.01); *H04L 9/321* (2013.01); *H04L 9/3236* (2013.01); *H04L 9/3257* (2013.01); *H04L 9/3297* (2013.01); *H04L 47/70* (2013.01); *H04L 63/08* (2013.01); *H04L 63/10* (2013.01); *H04W 8/02* (2013.01); *H04W 12/06* (2013.01); *H04W 12/08* (2013.01); *H04W 60/00* (2013.01); *G06F 2009/4557* (2013.01); *G06F 2009/45595* (2013.01); *G06Q 2220/00* (2013.01); *H04L 2209/38* (2013.01); *H04W 8/18* (2013.01); *H04W 60/04* (2013.01); *H04W 88/02* (2013.01)

(58) Field of Classification Search
USPC .......................................................... 713/168
See application file for complete search history.

(56) References Cited

U.S. PATENT DOCUMENTS

| | | |
|---|---|---|
| 5,751,223 A | 5/1998 | Turner |
| 6,812,824 B1 | 11/2004 | Goldinger et al. |
| D552,603 S | 10/2007 | Tierney |
| 7,573,862 B2 | 8/2009 | Chambers et al. |
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,396,485 B2 | 3/2013 | Grainger et al. |
| 8,446,899 B2 | 5/2013 | Lei et al. |
| 8,457,145 B2 | 6/2013 | Zimmerman et al. |
| 8,458,184 B2 | 6/2013 | Dorogusker et al. |
| D691,636 S | 10/2013 | Bunton |
| 8,549,638 B2 | 10/2013 | Aziz |
| 8,553,634 B2 | 10/2013 | Chun et al. |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,761,174 B2 | 6/2014 | Jing et al. |
| 8,768,389 B2 | 7/2014 | Nenner et al. |
| 8,849,283 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| 9,270,709 B2 | 2/2016 | Shatzkamer et al. |
| 9,271,216 B2 | 2/2016 | Friman et al. |
| 9,281,955 B2 | 3/2016 | Moreno et al. |
| D757,424 S | 5/2016 | Phillips et al. |
| D759,639 S | 6/2016 | Moon et al. |
| 9,369,387 B2 | 6/2016 | Filsfils et al. |
| 9,389,992 B2 | 7/2016 | Gataullin et al. |
| 9,426,305 B2 | 8/2016 | De Foy et al. |
| D767,548 S | 9/2016 | Snyder et al. |
| 9,467,918 B1 | 10/2016 | Kwan |
| D776,634 S | 1/2017 | Lee et al. |
| 9,544,337 B2 | 1/2017 | Eswara et al. |
| 9,569,771 B2 | 2/2017 | Lesavich et al. |
| 9,609,504 B2 | 3/2017 | Karlqvist et al. |
| 9,615,268 B2 | 4/2017 | Navarro et al. |
| 9,634,952 B2 | 4/2017 | Gopinathan et al. |
| 9,642,167 B1 | 5/2017 | Snyder et al. |
| 9,654,344 B2 | 5/2017 | Chan et al. |
| 9,712,444 B1 | 7/2017 | Bolshinsky et al. |
| 9,713,114 B2 | 7/2017 | Yu |
| 9,736,056 B2 | 8/2017 | Vasseur et al. |
| 9,762,683 B2 | 9/2017 | Karampurwala et al. |
| 9,772,927 B2 | 9/2017 | Gounares et al. |
| 9,820,105 B2 | 11/2017 | Snyder et al. |
| D804,450 S | 12/2017 | Speil et al. |
| 9,858,559 B2 | 1/2018 | Raleigh et al. |
| 9,860,151 B2 | 1/2018 | Ganichev et al. |
| 9,923,780 B2 | 3/2018 | Rao et al. |
| 9,933,224 B2 | 4/2018 | Dumitriu et al. |
| 9,961,560 B2 | 5/2018 | Farkas et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 9,998,368 B2 | 6/2018 | Chen et al. |
| 10,108,954 B2 | 10/2018 | Dunlevy et al. |
| 10,123,202 B1 | 11/2018 | Polehn et al. |
| 10,164,779 B2 | 12/2018 | Uhr |
| 10,171,248 B2 | 1/2019 | King |
| 2003/0087645 A1 | 5/2003 | Kim et al. |
| 2003/0116634 A1 | 6/2003 | Tanaka |
| 2004/0029576 A1 | 2/2004 | Flykt et al. |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0146803 A1 | 7/2006 | Bae et al. |
| 2006/0187866 A1 | 8/2006 | Werb et al. |
| 2006/0245406 A1 | 11/2006 | Shim |
| 2007/0037605 A1 | 2/2007 | Logan |
| 2007/0130471 A1 | 6/2007 | Walker Pina et al. |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0129389 A1 | 5/2009 | Halna DeFretay et al. |
| 2009/0203370 A1 | 8/2009 | Giles et al. |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2011/0087799 A1 | 4/2011 | Padhye et al. |

(56) References Cited

U.S. PATENT DOCUMENTS

| | | | |
|---|---|---|---|
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2012/0023552 A1 | 1/2012 | Brown et al. |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0284777 A1* | 11/2012 | Eugenio ............... H04W 4/70 726/4 |
| 2012/0311127 A1 | 12/2012 | Kandula, Sr. et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0031031 A1 | 1/2014 | Gauvreau et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1 | 8/2014 | Mermoud et al. |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2015/0379510 A1 | 12/2015 | Smith |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0116693 A1 | 4/2017 | Rae et al. |
| 2017/0164212 A1 | 6/2017 | Opsenica et al. |
| 2017/0177898 A1 | 6/2017 | Dillenberger |
| 2017/0180134 A1 | 6/2017 | King |
| 2017/0180999 A1 | 6/2017 | Alderfer et al. |
| 2017/0181136 A1 | 6/2017 | Bharadwaj et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0214675 A1 | 7/2017 | Johnsrud et al. |
| 2017/0243208 A1 | 8/2017 | Kurian et al. |
| 2017/0273083 A1 | 9/2017 | Chen et al. |
| 2017/0302663 A1 | 10/2017 | Nainar et al. |
| 2017/0317997 A1 | 11/2017 | Smith et al. |
| 2017/0330179 A1 | 11/2017 | Song et al. |
| 2017/0330180 A1 | 11/2017 | Song et al. |
| 2017/0332421 A1 | 11/2017 | Sternberg et al. |
| 2017/0339706 A1 | 11/2017 | Andreoli-Fang et al. |
| 2017/0364700 A1 | 12/2017 | Goldfarb et al. |
| 2018/0060835 A1 | 3/2018 | Martin |
| 2018/0063018 A1 | 3/2018 | Bosch et al. |
| 2018/0069311 A1 | 3/2018 | Pallas et al. |
| 2018/0082076 A1 | 3/2018 | Murray |
| 2018/0084389 A1 | 3/2018 | Snyder et al. |
| 2018/0084427 A1 | 3/2018 | Huo |
| 2018/0136633 A1 | 5/2018 | Small et al. |
| 2018/0137512 A1 | 5/2018 | Georgiadis et al. |
| 2018/0139056 A1 | 5/2018 | Imai et al. |
| 2018/0139107 A1 | 5/2018 | Senarath et al. |
| 2018/0197173 A1 | 7/2018 | Durvasula et al. |
| 2018/0212970 A1 | 7/2018 | Chen et al. |
| 2018/0253539 A1 | 9/2018 | Minter et al. |
| 2018/0287806 A1 | 10/2018 | Carboni et al. |
| 2018/0294966 A1 | 10/2018 | Hyun et al. |
| 2018/0294977 A1 | 10/2018 | Uhr et al. |
| 2018/0343128 A1 | 11/2018 | Uhr et al. |
| 2018/0374094 A1 | 12/2018 | Kohli et al. |
| 2019/0005470 A1 | 1/2019 | Uhr et al. |
| 2019/0012695 A1* | 1/2019 | Bishnoi ............... G06Q 20/223 |
| 2019/0058709 A1 | 2/2019 | Kempf et al. |

FOREIGN PATENT DOCUMENTS

| | | |
|---|---|---|
| WO | WO 2014/098556 | 6/2014 |
| WO | WO 2015/131920 | 9/2015 |
| WO | WO 2017/078657 | 5/2017 |
| WO | WO 2017/080518 A1 | 5/2017 |
| WO | WO 2017/187011 | 11/2017 |
| WO | WO 2017187397 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

"Cisco 10000 Series Router Quality of Service Configuration Guide, Chapter 20: Configuring Quality of Service for MPLS Traffic," Cisco Systems, Inc., Updated Nov. 17, 2013, pp. 1-34.

"Enterprise Mobility 7.3 Design Guide, Chapter 11: CISCO Mobility Services Engine," Cisco Systems, Inc., Updated Apr. 20, 2015, 8 pages.

"I Love WiFi, The difference between L2 and L3 Roaming Events," Apr. 1, 2010, 6 pages.

"Quality of Service Regulation Manual," ITU 2017, pp. 1-174.

"Wi-FI Location-Based Services 4.1 Design Guide," May 20, 2008, 206 pages.

Afolabi, Ibrahim, et al., "Network Slicing & Softwarization: A Survey on Principles, Enabling Technologies & Solutions," Mar. 21, 2018, pp. 1-24.

(56) References Cited

OTHER PUBLICATIONS

Ali, Z., et al., "Performance Measurement in Segment Routing Networks with IPv6 Data Plane (SRv6)," Spring Working Group, Feb. 26, 2018, pp. 1-17.
An, Xueli, et al., "Virtualization of Cellular Network EPC Gateways based on a Scalable SDN Architecture," IEEE, Feb. 12, 2015, pp. 1-7.
Antonioli, Roberto, et al., "Dual Connectivity for LTE-NR Cellular Networks," Research Gate, Sep. 3-6, 2017, pp. 171-175.
Bekan, Adnan, et al., "D5.1: Machine Learning Algorithms Development and Implementation," 2016-2018 eWINE Consortium, 23, 2016, pp. 1-72.
Bogale, Tadilo Endeshaw, et al., "Machine Intelligence Techniques for Next-Generation Context-Aware Wireless Networks," arxiv.org, Jan. 12, 2018, pp. 1-10.
Carter, Steve Sr., "E911 VoIP Essentials for Enterprise Deployments," XO Communications, LLC, 2012, 9 pages.
Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.
Cheng, W., et al., "Path Segment in MPLS Based Sement Routing Network," Network Working Group, Oct. 2017, pp. 1-10.
Christidis, Konstantinos, et al., "Blockchains and Smart Contracts for the Internet of Things," IEEE Access, Special Section on the of Research in Internet of Things (IoT), vol. 4, May 10, 2016, pp. 1-12.
Cox, Jacob H. Jr., et al., "Advancing Software-Defined Networks: A Survey," IEEE, Oct. 12, 2017, pp. 25487-25526.
Cui, Wenzhi et al., "DiFS: Distributed Flow Scheduling for Data Center Networks," Nanjing University, China, Jul. 28, 2013, 10 pages.
Doyle, Matthew G., "An IP Address Management Solution fora Server Solution Provider," A Dissertation Submitted to The University of Liverpool, Sep. 28, 2005, 116 pages.
Galvan T., Carlos E., et al., "Wifi bluetooth based combined positioning algorithm," International Meeting of Electrical Engineering Research ENIINVIE 2012, Procedia Engineering 35 (2012 ), pp. 101-108.
Geller, Michael, et al. , "5G Security Innovation with Cisco," Whitepaper Cisco Public, Jun. 8, 2018, pp. 1-29.
Gesbert, David, "Advances in Multiuser MIMO Systems (Tutorial Part II) Emerging Topics in Multiuser MIMO Networks," IEEE PIMRC Conference, Sep. 2007, 107 pages.
Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.
Herb, Daniel, et al., "ROAUM: How to Unblock ROAMING IoT Using BLockchain," available at https://uploads-ssl.webflow.com/5987a08baeea4300016b7bd9/5a7a6d6cee5bc400010a08f2 Roaum Roaming IoT Whitepaper.pdf, pp. 1-14.
Hsieh, Cynthia, "Location Awareness in VMware View 4.5 and Above," VMware, 2011, 8 pages.
Husain, Syed, et al., "Mobile Edge Computing with Network Resource Slicing for Internet-of-Things," IEEE 2017, pp. 1-7.
Jero, Samuel, et al., "Identifier Binding Attacks and Defenses in Software-Defined Networks," USENIX, The Advanced Computing Systems Association, Aug. 16-18, 2017, 19 pages.
Ji, Philip N., et al., "Demonstration of High-Speed MIMO OFDM Flexible Bandwidth Data Center Network," Optical Society of America, 2012, 2 pages.
Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.
Leonhardt, Ulf, "Supporting Location-Awareness in Open Distributed Systems," May 1998, 186 pages.
Morozov, Yury, "Blockchain Telecom: Bubbletone Blockchain," Dec. 29, 2017, pp. 1-33.
Network Heresy, "NVGRE, VXLAN and What Microsoft is Doing Right," Oct. 3, 2011, 5 pages.
Norwegian National Security Authority, "N-03 Security guidance for switches and routers," Sep. 26, 2012, pp. 1-24.
Saraiva de Sousa, Nathan F., et al., "Network Service Orchestration: A Survey," IEEE Communications Surveys & Tutorials, Mar. 23, 2018, pp. 1-30.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.
Shwetha, D., et al.," a Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.
Sun, et al., "The future of Wi-Fi," IEEE Communications Magazine, vol. 52, No. 11, Nov. 21, 2014, 166 pages.
Ventre, Pier Luigi, et al., "Performance Evaluation and Tuning of Virtual Infrastructure Managers for (Micro) Virtual Network Functions," ieee.org, Nov. 7-10, 2016, pp. 1-7.
Wright, Joshua, "Detecting Wireless LAN MAC Address Spoofing," Jan. 21, 2003, pp. 1-20.
Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.
Abdulqadder, Ihsan H., et al, "Deployment of Robust Security Scheme in SDN Based 5G Network Over NFV Enabled Cloud Environment," IEEE, 2018, pp. 1-12.
"Blockchain @ Telco: How blockchain can impact the telecommunications industry and its relevance to the C-Suite," Monitor Deloitte, Jun. 20, 2018, 13 pages.
Kaloxylos, Alexandros, "A Survey and an Analysis of Network Slicing in 5G Networks," IEEE Communications Standards Magazine, Mar. 2018, pp. 60-65.
Leukert, Bernd, et al., "IoT 2020: Smart and secure IoT platform," International Electrotechnical Commission, Oct. 11 2016, 181 pages.
Lin, Jun, et al., "Using blockchain to build trusted LoRaWAN sharing server," Emeraldinsight.com, Sep. 7, 2017, pp. 1-15.
Moinet, Axel, et al., "Blockchain based trust & authentication for decentralized sensor networks," Jun. 6, 2017, 6 pages.
Yang, Hui, et al., "Blockchain-based trusted authentication in cloud radio over fiber network for 5g," Optical Communications and Networks (ICOCN), 2017 $16^{th}$ International Conference on IEEE, 2017, 3 pages.
International Search Report and Written Opinion from the International Searching Authority, dated Jul. 31, 2019, 12 pages, for corresponding International Patent Application No. PCT/US2019/035146.
Alvarenga, Igor D., et al., "Securing Configuration Management and Migration of Virtual Network Functions Using Blockchain," Apr. 23, 2018, pp. 1-9.

* cited by examiner

PROVISIONING NETWORK RESOURCES IN A WIRELESS NETWORK USING A NATIVE BLOCKCHAIN PLATFORM

CROSS REFERENCE TO RELATED APPLICATIONS

The present application is claiming priority to U.S. Provisional Patent Application Ser. No. 62/682,778, filed on Jun. 8, 2018, the contents of which are incorporated herein by reference to its entirety.

TECHNICAL FIELD

The present subject matter relates generally to communication networks, and more particularly, to natively integrating blockchain charging for network services in telecommunication networks (e.g., 4G, 5G, etc.)

BACKGROUND

An ever-increasing consumer demand, improved technological advancements (e.g., hardware/software infrastructure), and industry collaboration has driven significant growth in modern telecommunication networks and continues to drive its evolution. Indeed, each iteration or "next generation" of network capabilities, e.g., represented by standards promulgated by a Third Generation Partnership Project (3GPP), interconnects more devices, improves network bandwidth, increases data-rates, and so on. For example, a transition from $3^{rd}$ Generation (3G) networks to $4^{th}$ Generation (4G) networks introduced new network services and connected mobile devices to third party data networks such as the Internet. More recently, a transition is underway from existing 4G networks to new 5G networks, which includes a new service-oriented architecture for provisioning network services/resources in a dynamic, scalable, and customizable fashion (e.g., micro-services, network functions virtualization (NFV), etc.) For example, this service-oriented architecture supports granular network slices, which employ an isolated set of programmable resources that can implement individual network functions/application services/etc. In turn, this granular approach creates new opportunities in the context of provisioning network resources, security, accounting (e.g., charging for network services), authorization, and so on, which can be leveraged to improve overall UE accessibility and mobility.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
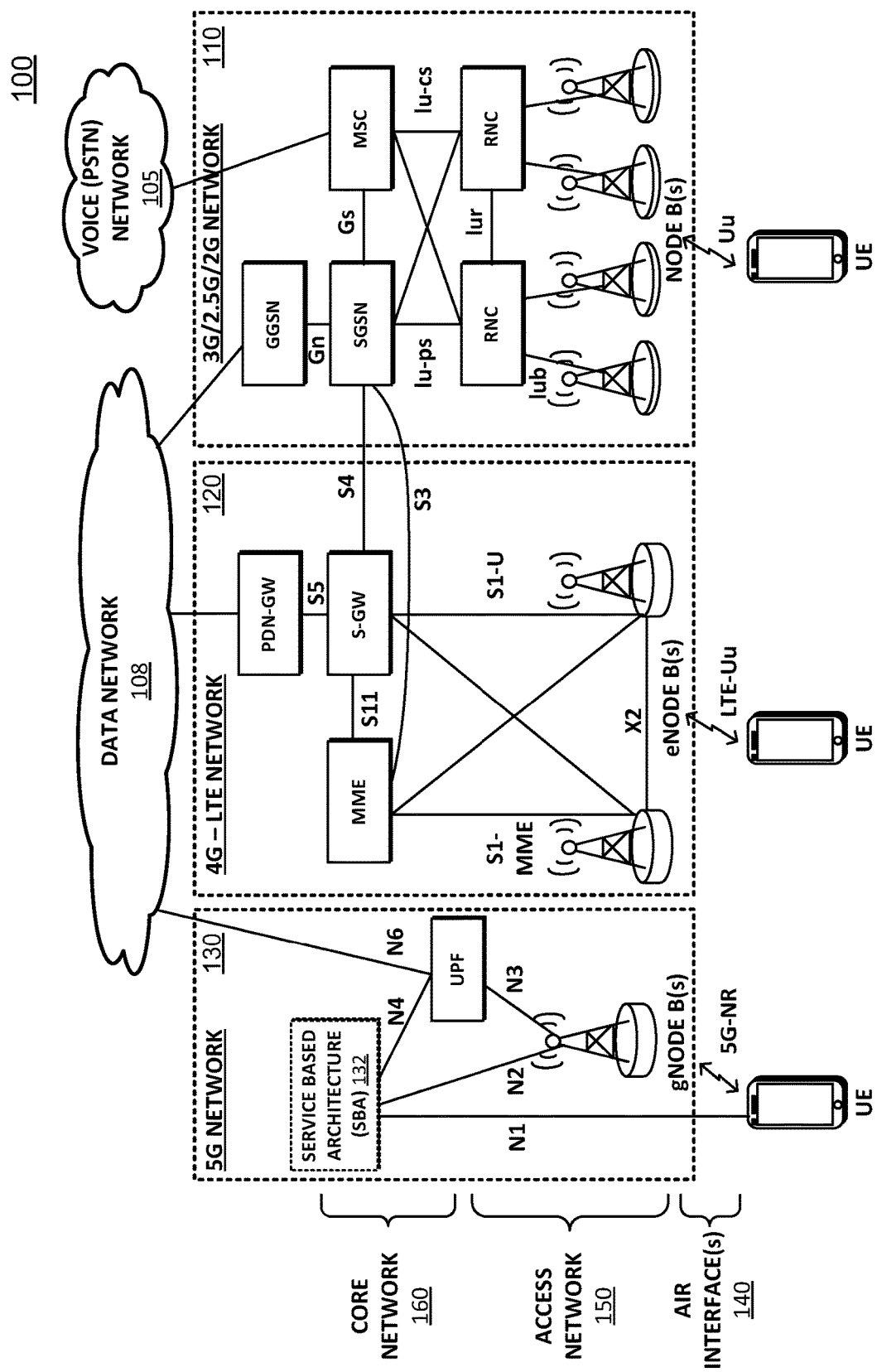
FIG. 1 illustrates a schematic block diagram of exemplary telecommunication networks, including a 3G network, a 4G network, and a 5G network.

This disclosure describes techniques for charging and accounting records generated by network functions (NF) such as a User Plane Forwarder (UPF) entity and Session management Function (SMF) entity for User Equipment (UE) attached in a telecommunication network (e.g., 4G/5G networks, etc.) using a natively integrated blockchain platform. For example, according to one or more embodiments of this disclosure, a Network Function (NF) entity such as one or more of the core NFs in a Service Based Architecture for 5G networks, receives blockchain credentials associated with User Equipment, and generates an entry in a Charging Data Record (CDR) corresponding to one or more network resources. The NF entity further sends a charging request based on the CDR to a Blockchain Charging Function (BCF) entity over a blockchain network interface. Notably, the charging request can include blockchain credentials associated with the UE as well as a charge transaction (e.g., an amount) for provisioning the one or more network resources. The NF entity further receives a confirmation of the charge transaction from the BCF entity, and provisions the one or more network resources based on the same.

Description

Various embodiments of the disclosure are discussed in detail below. While specific implementations are described in detail, it should be understood that this is done for illustration purposes only. A person skilled in the relevant art will recognize that other components and configurations may be used without departing from the spirit and scope of the disclosure.

As provided herein, this disclosure relates to communication networks (e.g., telecommunication networks), which include a number of network devices/modules/entities or "Network Function(s)" (NF(s)), which can be implemented as a network element on a dedicated hardware, as a software instance running on a dedicated hardware, and/or as a virtualized function instantiated on an appropriate platform (e.g. on a cloud infrastructure), as is appreciated by those skilled in the art. For sake of clarity, the NFs described herein are based on NFs specified by existing Technical Specifications such as the 3GPP TS 23.501, TS 23.502, TS 24.501, TS 29.509, TS 29.518, TS 33.301, TS 33.501, each of which is incorporated herein by reference to its entirety. Moreover, while some operations and functionality may be described and/or attributed to a particular NF, it is appreciated that such operations are not intended to be limited to the particular NF, but may be performed by other NFs as appropriate, particularly in view of the ongoing development and evolving nature of telecommunication networks.

A communication network is a geographically distributed collection of nodes interconnected by communication links and segments for transporting data between end nodes, such as mobile devices, computers, personal computing devices (and so on), and other devices, such as network entities, sensors, etc. Many types of networks are available, ranging from local area networks (LANs) to wide area networks (WANs.) LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc. Some communication networks can include telecommunication networks, which transport data between end nodes, such as user equipment (UE), which can include mobile devices.

FIG. 1 illustrates a schematic block diagram of exemplary telecommunication networks 100, including a 3G network 110, a 4G network 120, and 5G network 130. Telecommunication networks 100 include wireless network interfaces or communication links, such as air interfaces 140, an access network 150, which represents radio infrastructure or radio towers, and a core network 160, which represents respective core network entities, network modules, or Network Functions (NF(s).) The wireless network interfaces or air interfaces 140 include Uu links for 3G network 110, LTE-Uu links for 4G network 120, and 5G-NR links for 5G network 130. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used, and that the view shown herein is for simplicity. In particular, the representations of telecommunication networks 100, including respective interconnected network entities, are illustrated and described herein for purposes of discussion, not limitation, and it is appreciated that the illustrated networks can support inter-network operability/compatibility, and can include (or exclude) any number of network entities, communication links, and the like.

Access network 150 represents the infrastructure or radio towers, such as a Radio Access Network (RAN), for receiving and transmitting data packets between end user nodes (UE) as well as the various network entities (e.g., core network entities.) Access network 150 includes NodeBs (NBs) for 3G network 110, eNodeBs (eNBs) for 4G network 120, and gNodeBs (gNBs) for 5G network 130. The infrastructure for each network may support different functionality and it is appreciated that infrastructure illustrated within one network can include appropriate hardware/software to support functionality of other telecommunication networks.

Respective network entities that form core network 160 (within the telecommunication networks 100) operatively connect respective RAN infrastructure (NBs, eNBs, gNBs) to third party networks such as a voice network 105 (e.g., a Public Switched Telephone Network (PSTN) network) and/or a data network (DN) 108 to create end-to-end connections. Prior to 3G (e.g., 2G, 2.5G, etc.) the third party network primarily included a voice network/PSTN 105 (e.g., a circuit switched network.) From 3G onward, the third party network transitioned to include a public network (e.g., the Internet), represented by data network 108 (e.g., a packet switched network.) Core network 160 and its respective network entities collectively operate to manage connections, bandwidth, and mobility for respective UE.

Notably, core network 160 evolved along three functional planes, including service management, session management, and mobility management. Service management for 2G and 3G networks includes operations to create an Integrated Services Digital Network (ISDN) over wireless links (e.g., Uu links.) Session management for 3G and 4G networks generally include operations establish, maintain, and release network resources (e.g., data connections.) In particular, in 3G network 110, session management includes a standalone General Packet Radio Service (GPRS) network, while 4G network 120 introduced a fully integrated data only network optimized for mobile broadband (where basic telephone operations are supported as one profile.) Mobility management generally includes operations that support movement of UE in a mobile network, such as system registration, location tracking and handover (e.g., often optimized reduce heavy signaling loads.) For example, in the context of 4G network 120, a Serving Gateway (SGW) and a Packet Data Gateway (PGW) support session management operations while mobility management operations (which maintains data sessions for mobile UE) are centralized within a Mobility Management Entity (MME).

5G network 130, as discussed in greater detail herein, introduces a new service base architecture (SBA) 132, which generally redistributes functionality of 4G network entities into smaller service-based functions/network entities. In addition, packet routing and forwarding functions (which are performed by SGW and PGW in 4G network 120) are realized as services rendered through a new network function/entity called the User Plane Function (UPF) entity. In this fashion, 5G network 130 provides a modular set of services that support dynamic and scalable deployment of resources to satisfy diverse user demands.

Figure 2:
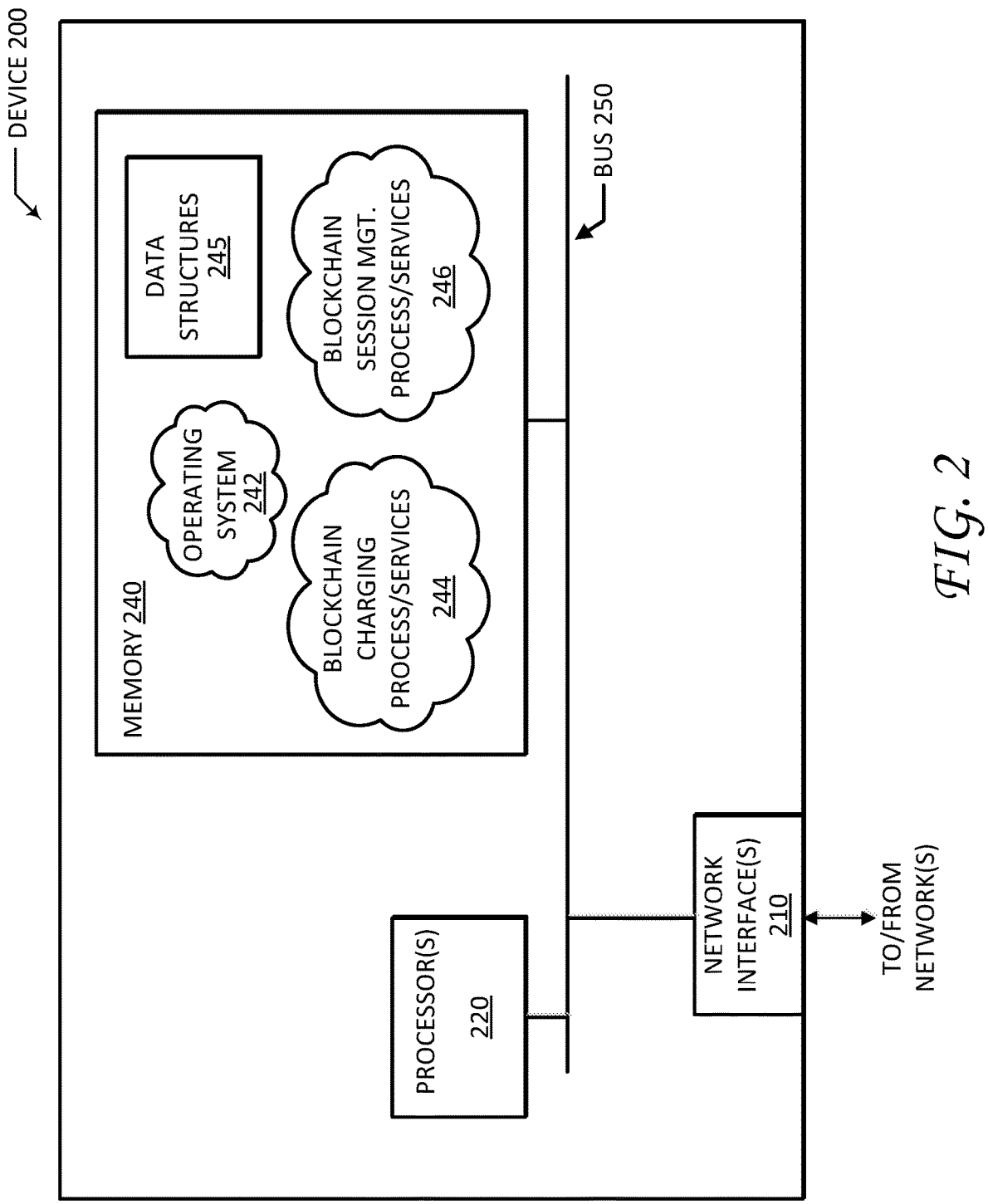
FIG. 2 illustrates a schematic block diagram of an exemplary network device, such as a Network Function (NF) entity/module, according to one or more embodiments of this disclosure.

FIG. 2 illustrates a schematic block diagram of an exemplary network device or Network Function (NF) entity 200 that may be used with one or more embodiments described herein, e.g., particularly as User Equipment (UE) and/or other NFs within SBA 132 (e.g., an Access and Mobility Management Function (AMF) entity, Authentication Server Function (AUSF) entity, Session Management Function (SMF), and so on.)

The illustrative device/entity 200 comprises one or more network interfaces 210, at least one processor 220, and a memory 240 interconnected by a system bus 250. Network interface(s) 210 contain the mechanical, electrical, and signaling circuitry for communicating data over links (e.g., wires or wireless links) within the telecommunication networks 100 (e.g., ref. FIG. 1.) Network interfaces 210 may be configured to transmit and/or receive data using a variety of different communication protocols, as will be understood by those skilled in the art. Notably, network interfaces 210 may include new blockchain network interfaces (e.g., "BCx", "BCy", and/or "BCz") as discussed in greater detail below.

Memory 240 comprises a plurality of storage locations that are addressable by processor 220 for storing software programs and data structures associated with the embodiments described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of services and/or software processes executing on the device/module. These services and/or software processes may comprise an illustrative "blockchain charging" process/service 244 as well as a "blockchain session management" process/services 246, as described herein. Note that while processes/services 244 and 246 are shown in centralized memory 240, some embodiments provide for these processes/services to be operated in a distributed communication network.

Illustratively, the techniques described herein may be performed by hardware, software, and/or firmware, such as in accordance with the illustrative blockchain charging process 244 and/or the illustrative blockchain session management process 246, which may contain computer executable instructions executed by processor 220 to perform functions relating to UE authentication and/or UE session establishment, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process.) Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having blockchain charging process 244 and/or blockchain session management process 246 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, a transition is currently underway from existing 4G networks to 5G networks, which introduces a new service-oriented architecture (e.g., SBA 132—FIG. 1.) While 3G and 4G networks provision network resources and support UE mobility (e.g., registration, session establishment, session maintenance) based on voice network infrastructure (e.g., circuit-switched) and/or conventional data network infrastructure (e.g., packet switched), the 5G networks introduce new service-based approach embodied by the service-oriented architecture. This service-oriented architecture can provision network services/resources in a dynamic, scalable, and customizable fashion using, for example, network slices, micro-services, network functions virtualization (NFV), and so on. With respect to network slices, each network slice can include an isolated set of programmable resources that may implement individual network functions and/or application services through software programs within a respective network slice, without interfering with other functions and services on coexisting network slices. In this fashion, a network slice can include a set of Network Functions (NFs) and corresponding resources (e.g., compute, storage, networking, etc.) Control plane design for 5G networks supports network slices—e.g., network services are represented as NFs and are exposed/available to the network over respective service-based interfaces (SBIs.) Once a NF registers its services with a Network Functions Repository Function (NRF) entity, the NF's services are exposed to other NFs such that any authorized consumer can consume.

In order to provision network resources, whether over existing 3G/4G networks or via the new SBA for 5G networks, the UE typically registers or authenticates with the network and further establishes a data session (which describes charging, billing, QoS, etc.) Sessions are typically managed as part of a connectivity service (e.g., PDU Connectivity Service), which defines rules for exchanging data packets (e.g., Protocol Data Units (PDUs)) between the UE and a data network. In the context of 5G networks, each session is typically associated with a respective network slice (e.g., one session belongs to one slice.) This disclosure provides complimentary and/or alternative mechanisms such as blockchain registration processes as well as blockchain session management processes to enhance dynamic and flexible workload provisioning, session establishment, and improve overall UE mobility with a natively integrated blockchain platform.

With respect to blockchain, blockchain technologies generally facilitate transparent, verifiable, and secure digital asset transactions with proof of rights and ownership. For example, blockchain technologies generally employ distributed ledger technology (DLT) with built-in cryptography to enable open and trusted exchanges over the internet without requiring central servers and/or independent trusted authorities. However, despite its advantages, existing protocols/network architectures in the telecommunications context fail to support native blockchain technologies due, in part, to underlying security requirements for initial registration processes. For example, while some blockchain technologies can be employed within existing telecommunication networks, mobile network operators and/or mobile network entities are often unaware of any blockchain transaction because such blockchain transaction only occurs after a mobile session is established (e.g., using overlay messages).

Accordingly, embodiments of this disclosure provide a native blockchain platform that employs blockchain operations that can serve as additional, alternative, or supplemental registration processes and/or session management processes within a mobile network. Moreover, the disclosed blockchain processes can operate in conjunction with various mobile Network Functions (NFs) or other network entities (including UE) over new blockchain network interfaces, satisfy security requirements for network service providers, and provide access to new types of devices/users. The native blockchain platform and the blockchain processes of this disclosure support device registration and/or session management in the context of local networks (e.g., the UE is connected to its local/home network) as well as roaming networks (e.g., the UE is outside of its local/home network and attempts to connect to a roaming/visiting network).

Figure 3A:
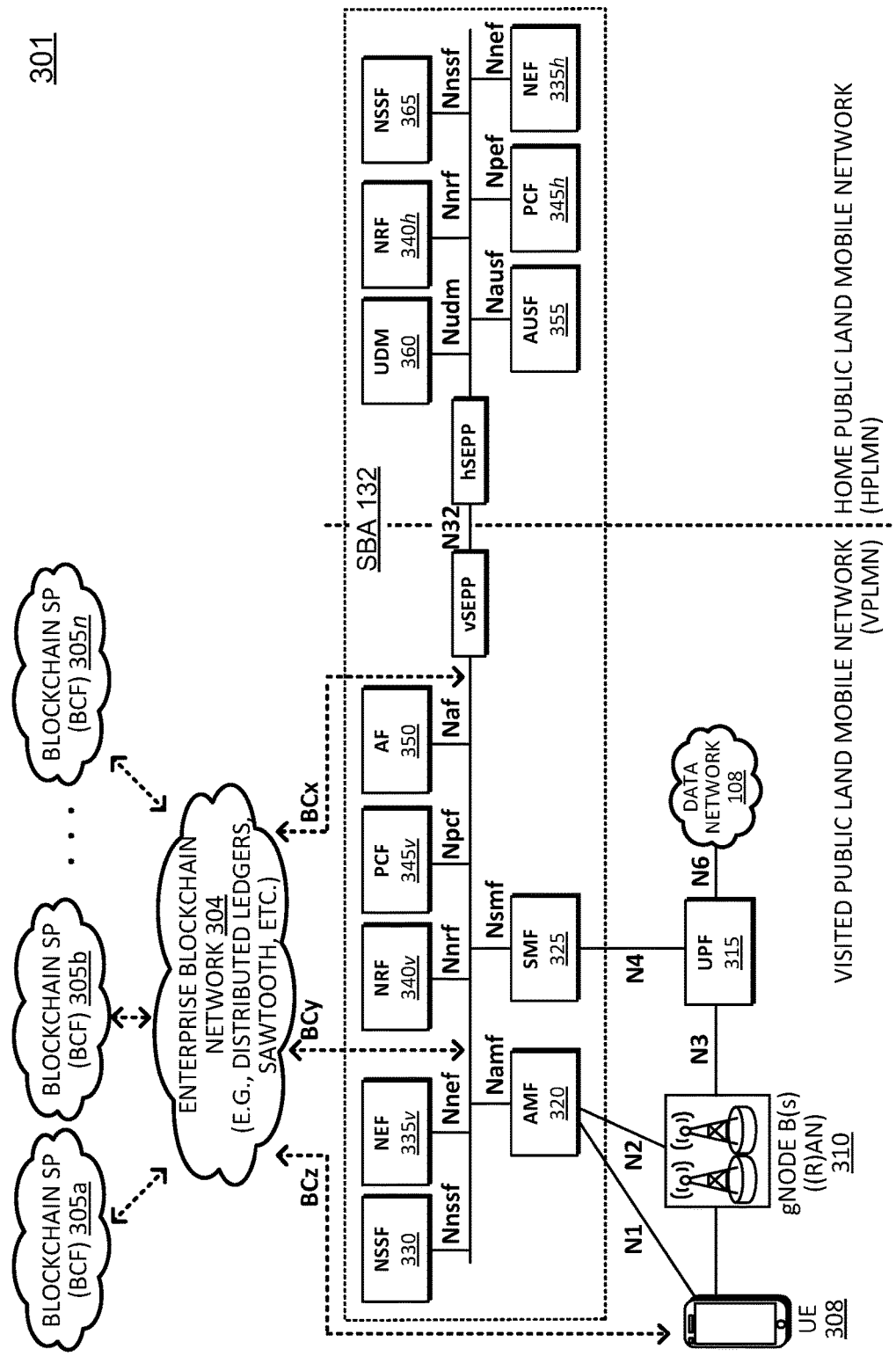
FIG. 3A illustrates schematic block diagram of an architecture for a service based interface representation of a Service Based Architecture (SBA)
Figure 3B:
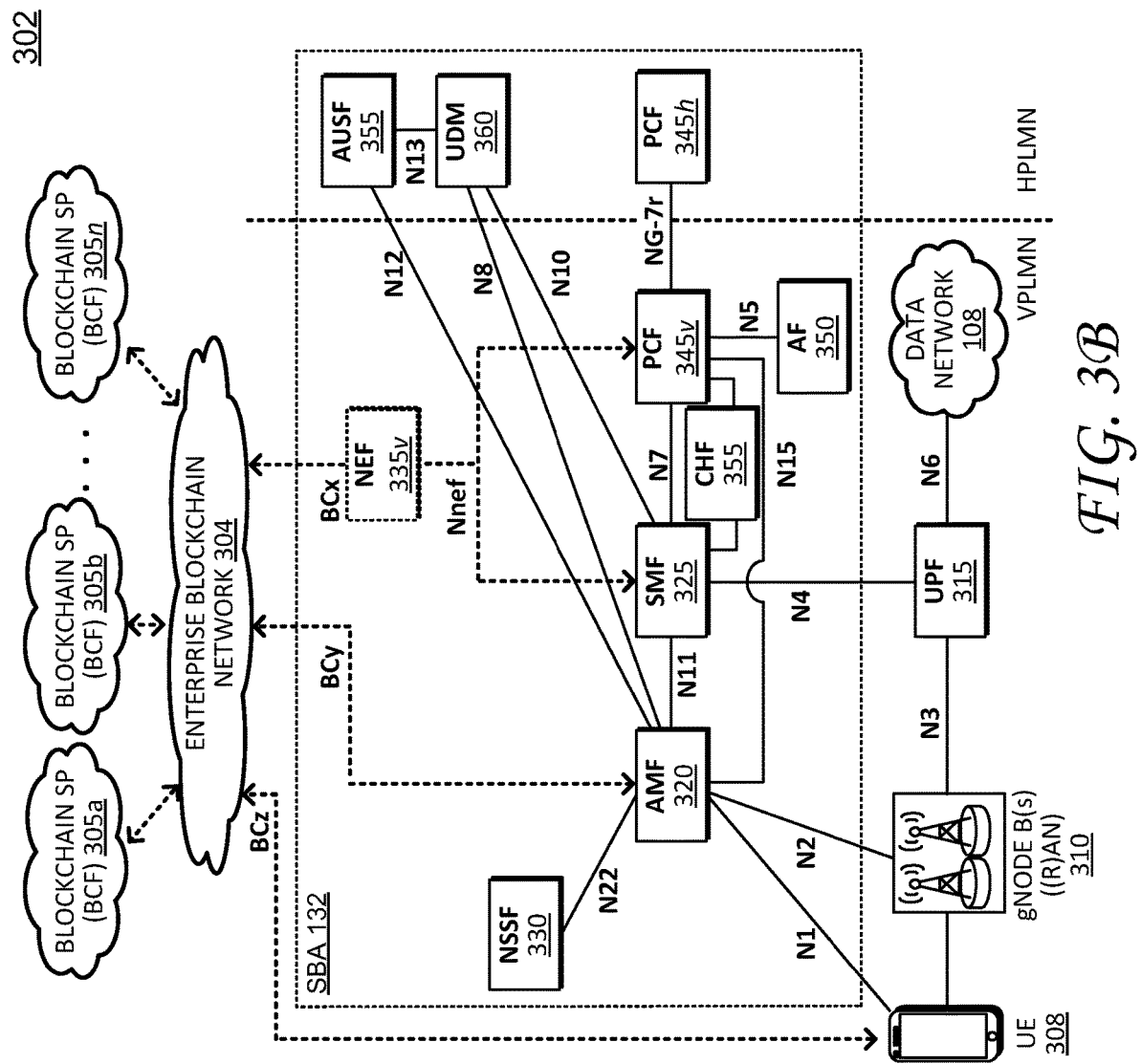
FIG. 3B illustrates a schematic block diagram of reference point representation of the architecture shown in FIG. 3A.

Referring again to the figures, FIG. 3A illustrates a schematic block diagram 301, showing a blockchain platform natively integrated with a Service Based Architecture (e.g., SBA 132) for a 5G network (e.g., 5G network 130), and FIG. 3B illustrates a schematic block diagram 302, showing a reference point architecture for the blockchain platform of FIG. 3A. Collectively, FIGS. 3A and 3B illustrate a native blockchain platform, labelled as an enterprise blockchain network 304. Blockchain network 304 may represent an open source blockchain network or platform such distributed ledgers, hyperledger Sawtooth, and the like. As shown, enterprise blockchain network 304 interconnects blockchain service providers (SPs) or Blockchain Charging Function (BCF) entities 305a-305n (e.g., distributed ledger technology (DLT) entities, etc.) with other network entities over one or more blockchain network interfaces BCx, BCy, and BCz. Notably, the blockchain network interfaces can represent network interfaces 210 for device/entity 200, discussed above.

The blockchain interfaces represent communication links that facilitate an exchange of messages or data packets between BCF(s) and SBA 132 (e.g., one or more NFs that form SBA 132). In particular, BCx can facilitate exchanging messages related to policy request, authorization, network usage, lawful intercept, accounting, and the like. BCy can facilitate exchanging messages related to secondary authentication, authorization, resource sharing, lawful intercept, network slicing, etc. BCz can facilitate exchanging messages related to standalone Authentication public key preset, authorization, Distributed Ledger Technology query/set, etc.

Blockchain network 304 generally facilitates sharing network resources or access to network functions (NFs), such as Access and Mobility Management Function (AMF), Session Management Function (SMF), Network Repository Function (NRF), and so on, with User Equipment (e.g., UE 308), and creates specific trust boundaries across multiple service providers using distributed blockchain ledgers, as discussed in greater detail herein.

With specific reference to FIG. 3A, schematic block diagram 301 illustrates a roaming architecture with a local breakout scenario for a service based interface representation of SBA 132. As shown, this roaming architecture includes a Visited Public Land Mobile Network (VPLMN) and a Home Public Land Mobile Network (HPLMN). A Public Land Mobile Network (PLMN) is a network established and operated by a carrier for providing mobile communication services to its subscribers. Generally, domestic subscribers for a carrier use roaming to receive services from abroad. A HPLMN refers to the subscriber's home network (e.g., domestic carrier) while VPLMN refers to the subscriber's abroad network (where the UE may be registered while roaming). While FIG. 3A illustrates the roaming architecture with the local breakout scenario, it is appreciated other architectures may be employed (e.g., home routing, etc.) Further, as shown here, some network entities such as the Session Management Function (SMF) and the User Plane Function(s) (UPF(s)) involved in a PDU session management may be under the control of the VPLMN.

Network entities of SBA 132 include AMF 320, SMF 325, Network Slice Selection Function (NSSF) 330, Network Exposure Function (NEF) 335v|335h, Network Repository Function (NRF) 340v|340h, Policy Control Function (PCF) 345v|345h, and Application Function (AF) 350. These network entities can be implemented either as a network element on a dedicated hardware, as a software instance running on a dedicated hardware, or as a virtualized function instantiated on an appropriate platform, e.g., a cloud infrastructure, as is appreciated by those skilled in the art.

In general, UE 308 connects to RAN/Access Network (AN) 310 as well as AMF 320 over respective network interfaces. Here, the RAN can include a base station while the AN can include a base station supporting non-3GPP access, e.g., Wi-Fi access. AMF 320 provides UE-based authentication, authorization, mobility management, etc. Notably, AMF 320 represents a common entity logically associated with all network slices instances that serve UE 308. As part of a registration procedure for UE 308, AMF 320 typically selects network slice instances for UE 308 by, for example, invoking or interacting with NSSF 330 to retrieve appropriate network slice instances based on UE subscription data.

SMF 325 is responsible for session management, IP address allocation to UE(s), and traffic management/selection of a User Plane Function (UPF) (e.g., UPF 315) for proper routing/data transfer. If UE 308 has multiple sessions, different SMFs may be allocated to each session for individual management and/or different functionality per session. In operation, AMF 320 can discover SMF 325 based on session request data from UE 308, as discussed in greater detail below.

AF 350 generally provides information on packet flows to PCF 345v, which is responsible for policy control in order to support Quality of Service (QoS.) PCF 345v determines policies about mobility and session management for proper AMF/SMF operations based on the information from AF 350.

AUSF 355 stores authentication data for UE 308, and UDM 360 stores subscription data for UE 308. Data network 108 provides Internet access or operator services.

Figure 4A:
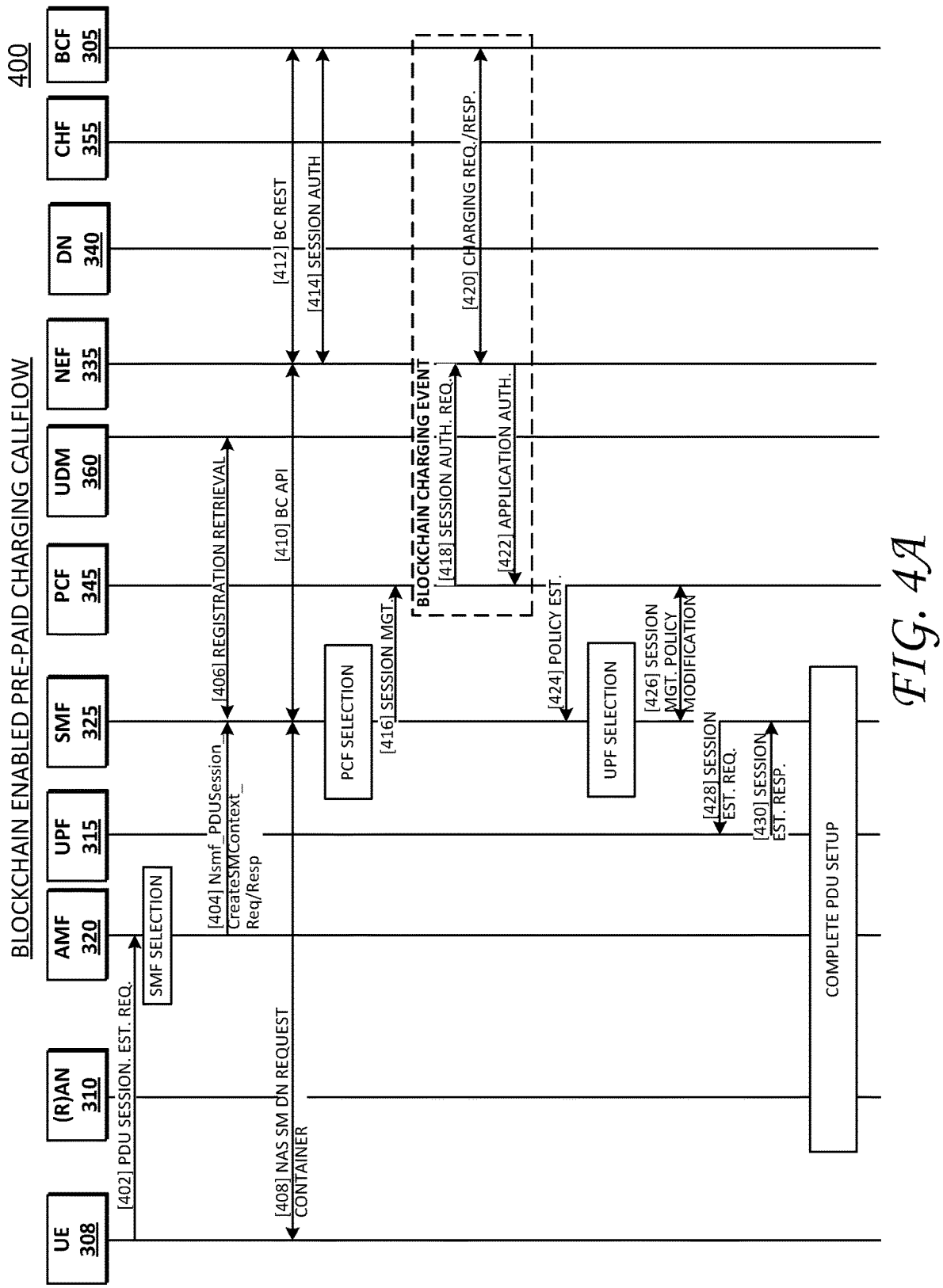
FIG. 4A illustrates a schematic signaling diagram, showing an enhanced blockchain pre-paid charging procedure for provisioning network services to User Equipment (UE)
Figure 4B:
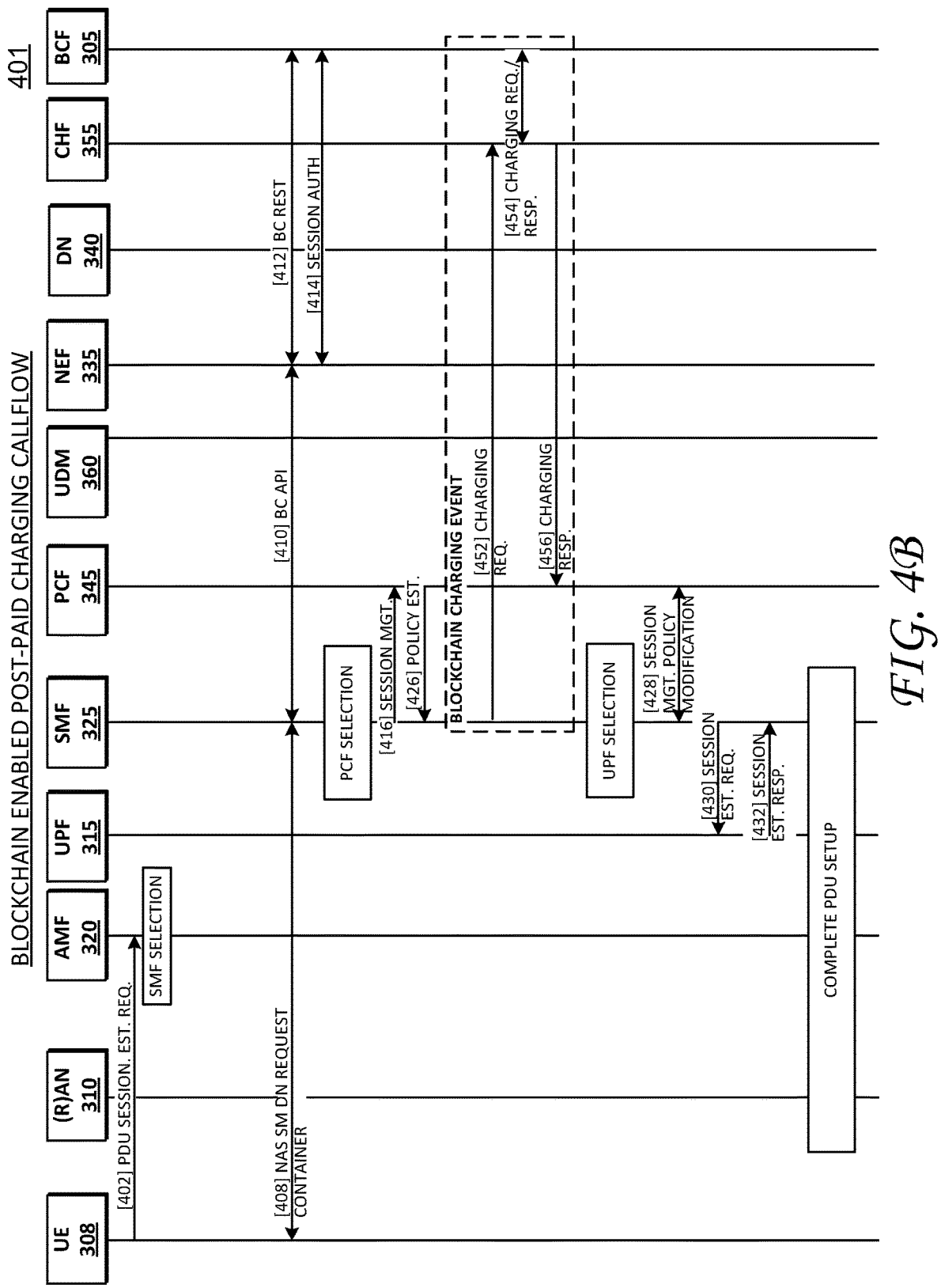
FIG. 4B illustrates a schematic signaling diagram, showing an enhanced blockchain post-paid charging procedure for provisioning network services to UE.

FIG. 3B illustrates a schematic block diagram 302, showing a reference point interface representation of SBA 132. Reference point representations often help develop detailed call flows in a normative standardization, which are illustrated in FIGS. 4A and 4B, described in greater detail below. It should be noted, for sake of clarity, certain network entities (e.g., NRF 340, etc.) are not shown in schematic block diagram 302. However, it is appreciated that any of the illustrated network entities can interact with the non-illustrated entities as appropriate.

As illustrated, the native blockchain platform includes enterprise blockchain network 304, which interconnects blockchain service providers (SPs), represented as Blockchain Charging Function (BCF) entities 305a-305n (also referred to as BCF 305 herein), with various mobile network entities over respective blockchain network interfaces BCx, BCy, and BCz.

BCx exchanges messages such as policy requests, authorizations, network usage, lawful intercept, accounting, and etc., BCy exchanges messages such as secondary authentication, authorization, resource sharing, lawful intercept, network slicing, and etc., and BCz exchanges messages such as standalone authentication public key present, authorization, blockchain entity queries/set, and etc.

The native blockchain platform operably supports additional and/or alternative blockchain charging procedures for registering UE as well as session management procedures for PDN/PDU sessions. Notably, the blockchain charging procedure/operations may be represented by Blockchain charging process/services 244 and the blockchain session management procedure/operations may be represented by blockchain session management process/services 246 (ref. FIG. 2.)

The blockchain charging procedure generally includes operations to register and attach UE to the network in order to encrypt and protect traffic between the UE and core network entities (e.g., SBA 132), while the blockchain session management procedure generally includes operations to establish sessions (e.g., PDU sessions/PDN sessions) in order to allocate session resources to relevant network slices, permit data transmission between UE 308 and data network 108, ensure appropriate Quality of Service (QoS) connectivity, satisfy Service Level Agreements (SLA(s)), etc.

As discussed in greater detail below, the blockchain session management processes may include authentication/authorization operations, however it is appreciated such operations relate to session management and may be separate from the Blockchain charging procedure for registering and attaching the UE to the network.

For registration and/or session management, the Blockchain charging/authorization operations generally include authentication messages exchanged between one or more core NFs and a Blockchain Charging Function (BCF) entity, which is exposed to the core NFs over new blockchain network interfaces. The authentication messages provide the BCF with UE credentials and the BCF, in turn, compares the UE credentials against UE credentials stored on a blockchain or distributed ledger. As is appreciated by those skilled in the art, the BCF returns authentication confirmation messages if the UE credentials match the UE credentials stored on the blockchain or distributed ledger.

Collectively referring to FIGS. 3A and 3B, various network entities cooperate to perform initial registration and attachment processes for UE 308. In particular, RAN/Access Network (AN) 310 broadcasts system information (e.g., PLMN-IDs) to various UE(s), including UE 308. UE 308 receives the PLMN-ID from RAN/Access Network (AN) 310 and, during its initial registration, UE 308 indicates support for a complimentary (and/or substitute) blockchain procedures (e.g., a Blockchain charging procedure, a blockchain session establishment procedure, etc.) For example, UE 308 can indicate support for these blockchain procedures in a radio layer message (e.g., a Radio Resource Control (RRC) message) sent to RAN/Access Network (AN) 310.

RAN/Access Network (AN) 310 receives the RRC messages from UE 308 and selects an appropriate AMF 320 (which supports the blockchain procedures) and/or redirects the RRC messages to a new AMF as appropriate. Here, RAN/AN 310 can determine the RRC message from UE 308 include an indication for the disclosed blockchain procedures (e.g., in an access category) and selects AMF 320 and/or redirects to a new AMF based on the AMF blockchain capabilities.

With respect to the Blockchain charging procedure (e.g., for attaching UE 308 to the network), AMF 320 exchanges authentication messages with one or more Blockchain Charging Function (BCF) entities (e.g., BCF(s) 305*a-n*) over blockchain network interfaces BCx and/or BCy. In particular, AMF 320 may send authentication messages to invoke/request that AUSF 355 perform authentication, which causes AUSF 355 to authenticate UE 308 with BCF 305 over blockchain network interface BCx. In other embodiments, AMF 320 can directly authenticate UE 308 with BCF 305 over blockchain network interface BCy, using for example, REST Application Program Interface (API) messages.

Still referring to FIGS. 3A and/or 3B, various network entities or NFs also cooperate to manage sessions for UE 308 (e.g., establish sessions, handover sessions, modify sessions, etc.) Sessions are typically managed as part of a connectivity service (e.g., PDU Connectivity Service), which defines rules for exchanging data packets (e.g., Protocol Data Units (PDUs)) between the UE (e.g., UE 308) and a data network (e.g., data network 108) based on session-specific Quality of Service (QoS) parameters. This connectivity service can include multiple PDU sessions, which are logical associations created between the 5G core network entities (e.g., SBA 132) and UE 308 to handle data packet exchanges. In the context of a 5G network, session management is flexible, scalable, and accommodates various service continuity modes (e.g., "make before break" options, relocation of core network functions, etc.) while maintaining seamless end-user services. The session management also supports concurrent local and central access to a data network and multi-access edge computing where an application at an edge data center can influence traffic routing to improve its performance.

While session management is illustrated and described herein in the context of 5G networks (e.g., PDU sessions), it is appreciated such session management and related operations can readily apply to 4G networks (e.g., PDN sessions, etc.) For example, as is appreciated by those skilled in the art, 4G networks create sessions using default data bearers (e.g., 4G networks), while the 5G networks establish a PDU session as-needed or on demand, independent of UE attachment procedures. Further, UE(s) can establish multiple PDU sessions to the same data network (or to different data networks) over a single or multiple access networks (e.g., 3GPP networks, non-3GPP networks, etc.) where each PDU session is associated with network slice—e.g., one S-NSSAI and one Data Network Name (DNN.) Notably, the PDU sessions can include various session types (e.g., IPv4, IPv6, Ethernet, unstructured, etc.)

In operation, UE 308 initiates session establishment by sending a PDU session request data to AMF 320 (e.g., as part of a PDU Session Establishment Request message.) Notably, when UE 308 attaches to the core network (e.g., SBA 132), UE 308 exchanges mobility management messages and session management messages with AMF 320 (e.g., over an NG1 NAS network interface.) Session management messages can be transmitted with the mobility management message supported by the NAS routing capability within AMF 320. Although AMF 320 is involved in sending session management messages, processing mobility messages and session management messages typically occurs in AMF 320 and SMF 325, respectively.

AMF 320 receives the PDU session request and discovers/selects an appropriate SMF (e.g., SMF 325) based on parameters included in the initial PDU session request from UE 308, such as session management service identification data, Single Network Slice Selection Assistance Information (S-NSSAI) data, Data Network Name (DNN) data, UE subscriptions, local operator policies, Blockchain charging data/capabilities, etc.) Although AMF 320 may not understand the full context of the session management messages, but it determines/selects an appropriate SMF for a new PDU session based on the above-mentioned parameters.

Here, AMF 320 selects SMF 325 and establishes a PDU session, which allocates PDU resources for a relevant network slice and permits data transmission/data packet exchanges between UE 308 and data network 108. In addition, AMF 320 also ensures that NAS signaling associated with the PDU session is handled by the same SMF (SMF 325) by assigning a PDU session identifier to the PDU session. UE 308, in turn, uses this PDU session identifier to route messages to the correct SMF.

As mentioned, PDU sessions are typically managed as part of a connectivity service (e.g., PDU Connectivity Service), which defines rules for exchanging data packets (e.g., Protocol Data Units (PDUs)) between the UE (e.g., UE 308) and a data network (e.g., data network 108) based on session-specific Quality of Service (QoS) parameters. Subscription information for each S-NSSAI can include multiple DNNs and one default DNN. When UE 308 does not specify a DNN in a NAS Message containing PDU Session Establishment Request for a given S-NSSAI, the serving AMF determines the DNN for the requested PDU Session by selecting the default DNN for this S-NSSAI if a default DNN is present in the UE's Subscription Information; otherwise the serving AMF selects a locally configured DNN for this S-NSSAI. If the DNN provided by the UE is not supported by the network and AMF can not select an SMF by querying NRF, the AMF may reject the NAS Message containing PDU Session Establishment Request from the UE with a cause indicating that the DNN is not supported.

Each PDU Session typically supports a single PDU Session type, e.g., supports the exchange of a single type of PDU requested by UE 308 at the establishment of the PDU Session. PDU Sessions are generally established upon UE request, modified upon UE 308/SBA 132 request, and released upon UE 308/SBA 132 request using NAS session management signaling exchanged over the N1 network interface between UE 308 and SMF 325. Upon request from an Application Server, SBA 132 is able to trigger a specific application in UE 308. When receiving the trigger message, UE 308 passes it to the identified application (in UE 308.) The identified application in UE 308 may establish a PDU Session to a specific DNN, in accordance with 3GPP TS 32.501, clause 4.4.5.

SMF 325 is responsible of checking whether UE requests are compliant with the user subscription. For this purpose, SMF 325 retrieves and requests to receive update notifications on SMF level subscription data from UDM 360. This subscription data can indicate (e.g., per DNN and per S-NSSAI) allowed PDU Session Types and the default PDU Session Type, allowed SSC modes and the default SSC mode, QoS Information, subscribed Session-AMBR, Default 5QI and Default ARP, static IP address/prefix, subscribed User Plane Security Policy, Charging Characteristics to be associated with the PDU Session, and so on.

In addition, UE 308 may request to move a PDU Session between 3GPP and Non 3GPP accesses. The decision to move PDU Sessions between 3GPP access and Non 3GPP access is made on a per PDU Session basis, e.g., UE 308 may, at a given time, have some PDU Sessions using 3GPP access while other PDU Sessions are using Non 3GPP access. UE 308 typically provides a PDU session ID in a PDU Session Establishment Request message. The PDU session ID is unique per UE and represents a unique identifier assigned to a PDU Session. The PDU session ID can be stored in UDM 360 to support handover between 3GPP and non-3GPP access—e.g., when different PLMNs are used for the two accesses.

While many of the above discussed operations may be performed as part of conventional session management processes, this disclosure further provides blockchain session management processes where one or more network entities/NFs of SBA 132 exchange messages with a Blockchain Charging Function (BCF) (e.g., one of BCF(s) 305*a-n* over new blockchain interfaces (e.g., BCx, BCy, BCz) in order to establish a session for UE 308. The disclosed blockchain session management processes may complement existing session management processes similar to secondary authentication processes that use an Authentication Authorization, and Accounting (AAA) server in a data network. However, here, the blockchain enterprise platform (e.g., enterprise blockchain network 304 and BCF(s) 305*a-n*) is natively integrated with and directly exposed to SBA 132. It is also appreciated that the blockchain session management processes, in other embodiments, may replace existing session management processes.

In operation, SMF 325 receives session request data associated with UE 308. This session request data may be included as part of a PDU Session Establishment Request message, which may comprise the above-mentioned parameters such as the Blockchain charging data. SMF 325 selects a Blockchain Charging Function (BCF 305) based on the session request data, and further exchanges at least a portion of the Blockchain charging data (e.g., Blockchain charging credentials associated with UE 308) with BCF 305 over a blockchain network interface (e.g., BCx and/or BCy, where SMF 325 may route messages through AMF 320, etc.)

In some embodiments, SMF 325 may further select an NEF (e.g., NEF 335—shown in a dashed box in FIG. 3B) to act as an Application Program Interface (API) gateway between SMF 325 and BCF 305. In these embodiments, SMF 325 exchanges authentication data with NEF 335, which in turn exchanges messages with BCF 305 over the blockchain network interface. In other embodiments, SMF 325 may directly communicate with BCF 305 over the blockchain network interface.

SMF 325 receives authentication confirmation data from BCF 305 over the blockchain network interface and establishes a session associated with the UE based on the authentication data.

These and other blockchain enabled charging and accounting features are described in greater detail with respect to the schematic signalling diagrams shown in FIGS. 4A and 4B, below.

FIG. 4A illustrates schematic signalling diagram 400 showing call flows for a blockchain enabled pre-paid charging process for provisioning network services (e.g., establishing a PDU session, etc.) In general, the illustrated blockchain enabled pre-paid charging process leverages a new blockchain network interface (BCx) to charge a member account on a blockchain before provisioning network services for UE 308 (e.g., UE belonging to an owner/controller of the member account) and incorporates NEF 335 to act as an API gateway between SMF 325 and BCF 305. In particular, FIG. 4A illustrates blockchain charging events between BCF 305 and NFs within SBA 132 (e.g., PCF 345/SMF 325) that provides funds directly for one or more network services in advance of the services being provisioned.

With respect to the illustrated call flow, UE 308 initiates, at step 402, an initial PDU (or PDN) session establishment request and sends session request data (e.g., Non-Access Stratum (NAS) messages) to AMF 320 over network interface N1. The NAS messages can include information such as Single Network Slice Selection Assistance Information (S-NSSAI), Data Network Name (DNN), PDU session IDs, request types, old PDU session IDs, an N1 Service Management (SM) container, indications/requests for blockchain authorization (e.g., as a secondary authorization) and/or access capabilities, and so on.

AMF 320 receives the session establishment request and further discovers/selects an appropriate SMF—here, SMF 325. In particular, AMF 320 discovers and selects SMF 325 based on parameters included in the initial PDU session request (e.g., step 402.) As mentioned, these parameters include S-NSSAI data, DNN data, UE subscriptions, local operator policies, blockchain charging data/blockchain capabilities, and so on.

Here, AMF 320 selects SMF 325 based, at least in part, on its blockchain capabilities and access. If AMF 320 does not have an association with a SMF for the PDU session ID (e.g., when Request Type indicates "initial request"), AMF 320 invokes a PDU session creation request (e.g., Nsmf_P-DUSession_CreateSMContext Request), as shown at step 404. However, if AMF 320 already has an association with an SMF for the PDU Session ID (e.g., when Request Type indicates "existing PDU Session"), the AMF invokes the Nsmf_PDUSession_UpdateSMContext Request.

At step 406, SMF 325 and UDM 360 exchange registration/subscription information for UE 308. SMF 325 further sends a corresponding PDU session SM context responses (e.g., an SM context identifier) to AMF 320, again at step 404. In this fashion, SMF 325 registers itself for an initial PDU session with UDM 360, in accordance with UE-requested PDU Session Establishment procedures provided by 3GPP TS 23.502.

Following step 406, NEF 335 may perform authorization/authentication operations as part of the PDN session establishment. These authorization/authentication operations may conform to secondary authentication/authorization operations such as Data Network (DN)-Authentication, Authorization, and Accounting (AAA) server, described by 3GPP TS 23.501, clause 5.6.6. In some examples, authorization/authentication operations may include interfacing with third-party APIs or other interfaces. In some cases, the authorization/authentication operations may include a blockchain based authentication procedure that can be performed over, for example, the BCx network interface, the BCy network interface, or both.

Here, steps 408-416 depict one example of a blockchain based authentication procedure. In particular, at step 408, UE 308 sends a NAS SM DN Request Container message to SMF 325 to request the blockchain authentication procedure as a secondary authorization for the PDN session (e.g., in accordance with secondary authorization request of 3GPP TS 23.501, clause 5.6.6). The NAS SM DN Request Container message includes blockchain information for PDU session authorization by an external Data Network (e.g., slice information (identified by S-NSSAI), PDU session ID, a PDN it would like to connect to (identified by DNN), a blockchain server ID (identifying BCF 305), etc.). This blockchain information may be provided as part of payload data, and/or may be included as part of follow-on request data.

Although the NAS SM DN Request Container message is illustrated as a single signal between UE 308 and SMF 325, it is appreciated this signal may be conveyed to SMF 325 by AMF 320. For example, UE 308 can send the signal to AMF 320 over the N1 network interface, and AMF 320 can send or forward the signal (or appropriate portions of the signal) to SMF 325 over the N11 network interface. In some embodiments, the NAS SM DN Request Container can include the PDU session establishment request message (e.g., step 402) as part of a N1 SM container, as is appreciated by those skilled in the art.

At step 410, UE 308 sends a NAS SM DN Request Container message to SMF 325 to request the blockchain authentication procedure as a secondary authorization for the PDN session (e.g., in accordance with secondary authorization request of 3GPP TS 23.501, clause 5.6.6.) The NAS SM DN Request Container message includes blockchain information for PDU session authorization by an external Data Network (e.g., slice information (identified by S-NSSAI), PDU session ID, a PDN it would like to connect to (identified by DNN), a blockchain server ID (identifying BCF 305), etc.) This blockchain information may be provided as part of payload data, and/or may be included as part of follow-on request data. At step 412, SMF 325 requests a secondary authentication for UE 308 via NEF 335, which serves as a gateway to BCF 305. SMF 325 may send NEF 335 an API blockchain call including credential information for UE 308. In response, at step 414, NEF 335 sends an authentication request to BCF 305 based at least in part on the included credentials and API blockchain call, which provides identification of an appropriate BCF entity. This authentication request is transmitted over the BCx network interface and, at step 416, BCF 305 returns authentication credentials to NEF 335 over the BCx network interface, which is forwarded to SMF 325 to provide complete session authorization and blockchain verification.

After successful authorization, SMF 325 continues with PDU establishment operations and, based on a PDU profile, selects a PCF and performs Session Management Policy Establishment procedure, as shown at step 418. SMF 325 can provide a blockchain flag and associated parameters (such as credential information and the like) to indicate to PCF 345 that charging capabilities can be obtained from BCF 305 (e.g., and/or via NEF 335.) For example, PCF 345 can use a charging data record (CDR) (received from SMF 325 at step 418) to identify NEF 335 and/or BCF 305.

PCF 345 may request, at step 418, service parameters (through NEF 335 for example), which can further obtain the service parameters through third-party APIs or externally facing interfaces (e.g., BCy, BCx, etc.) and the like.) PCF 345 further determines the network services, QoS, and charging plan to be applied to the PDU session associated with UE 308. At step 420, PCF 345 requests a session authorization for SMF 325 from NEF 335. The request includes policy information such as, for example and without imputing limitation, quota limitations, discounts, other relevant policies, and the like. NEF 335 sends a charge request to BCF 305 and receives a respective response back from BCF 305 at step 422. BCF 305 checks an account balance associated with UE 308 (e.g., indicated by the credentials provided above) and provides session authorization with usage information based on the account balance and/or success (or failure) of an attempted debit applied to the account of an amount based on the policy information provided above at step 420. At step 424, NEF 335 forwards authorization for the session to PCF 345, which may in turn forward authorization to SMF 325. Accounting may be started for UE 308 and, further, charging data records (CDRs) can be sent by PCF 345 or SMF 325 to BCF 305 (not shown).

SMF 325 further selects a UPF (e.g., UPF 315) to serve the PDU session and according to policy information provided at step 426. At steps 428-432, SMF 325 performs a.) policy management and/or modification in accordance with received policy information (e.g., reflecting the blockchain charging event) and in accordance with 3GPP TS 23.502 call flow).

The blockchain charging event includes operations for BCF 305 to debit blockchain payment credits (e.g., blockchain tokens) of a particular account (e.g., on an identified blockchain/distributed ledger) in order to pay for one or more network services for UE 308 are recorded and processed by SMF 325 and/or PCF 345. For example, BCF 305 can debit blockchain tokens of a blockchain eWallet associated with UE 308 before services are provided (or, as above, provide services reflecting the debit applied to the account).

In some instances, SMF 325 and PCF 345 can direct a return of tokens by BCF 305 should all the tokens deducted in this step not be consumed. For example, in response to a request by CHF 345, which may be integrated into SMF 325, PCF 345, or distributed between both, BCF 305 can create a smart contract on a particular blockchain. In comparison to other pre-paid services that use quotas from an Online Charging Server (OCS) (not an actual monetary fund), the blockchain charging event represents a flexible transaction that may include a prepayment of actual funds (which the service provider can return if the contract is not completed in an authorized time period) via, for example, a smart contract with an escrow functionality such as a conditional funds transfer or return.

In one or more additional embodiments, enhanced blockchain pre-paid charging operations also accommodate delayed authorization. For example, BCF 305 may require a certain amount of time to conclude a consensus, which may delay its response/fund verifications (e.g., as part of the blockchain charging event.) In these instances, SMF 325 can request PCF 345 to notify it when BCF 305 completes the charge.

As seen in signalling diagram 400, PDU set up may be completed by steps as defined by 3GPP TS 23.502, as is appreciated by those skilled in the art).

FIG. 4B illustrates a signalling diagram 401 for blockchain enabled post-paid charging processes (e.g., a PDU session, etc.) In particular, steps 402-418 are performed as discussed above. Notably, steps 420-424, which relate to pre-paid processes, are absent from diagram 401 as these steps are not performed in the post-paid charging process (e.g., charging occurs once a policy for a session has been established). As a result, step 426 follows step 418 in the post-paid charging signal sequence.

Once a policy is established by PCF 345 and provided to SMF 325, a blockchain charging event may occur. The blockchain charging event in signaling diagram 401 is represented by steps 452-456. At step 452 (following step 426), SMF 325 sends a charging request to a Charging Function (CHF) entity 355. CHF 355 in turn forwards the charging request to BCF 305 over BCx network interface because, as per steps 410-416, UE 310 is enabled with appropriate blockchain credentials and already authorized by BCF 305. BCF 305 verifies a balance in an appropriate account (e.g., an eWallet) identified by the blockchain credentials and allows the charging to the account (e.g., debits the account for an amount of tokens associated with the established policy at step 426), which is indicated to CHF 355. CHF 355 then forwards the authorization to PCF 345 at step 456, and PCF 345 informs SMF 325 of the authorization (not depicted.) UPF selection, steps 428-432, and PDU setup then occur as discussed above in reference to pre-paid charging and accounting signalling diagram 400.

Figure 5:
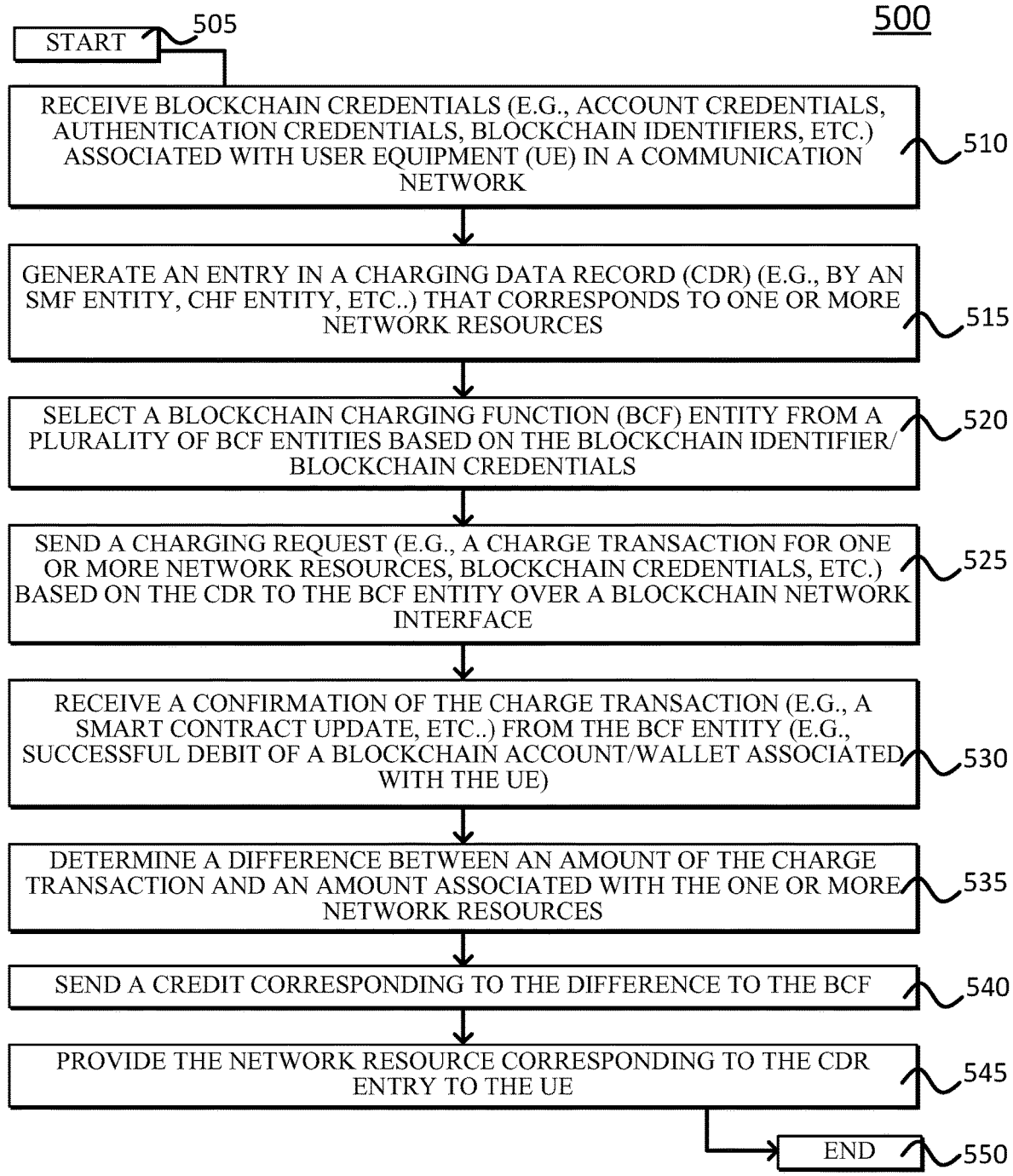
FIG. 5 illustrates an example simplified procedure for charging an account associated with UE in a communication network, in accordance with one or more embodiments of this disclosure.

FIG. 5 illustrates an example simplified procedure 500 for managing a data session associated with User Equipment (UE) in a communication network, in accordance with one or more embodiments of the blockchain charging procedure.

In this fashion, procedure 500 can include blockchain charging operations (e.g., blockchain charging process/services 244) represented by signals exchanged between one or more NF entities (e.g., device/entity 200) in a core network such as SBA 132 and a Blockchain Charging Function (BCF) entity (e.g., BCF 305). For example, the NF entities can include, for example, an AMF entity (AMF 320), an SMF entity (SMF 325), a PCF entity (PCF 345), and/or a CHF entity (CHF 355).

Procedure 500 begins at step 505 and continues on to step 510 where, as discussed above, the SMF entity receives blockchain credentials associated with User Equipment ((UE), such as UE 308.) Notably, session request data (including the blockchain credentials) may be sent from an AMF entity to the SMF entity. In addition, the credentials can include blockchain charging data associated with the UE (e.g., blockchain entity identifiers which identify a Blockchain Charging Function (BCF, such as BCF 305), and/or other information to solicit blockchain payment data from the BCF, and the like.)

At step 515, a Charging Data Record (CDR) corresponding to one or more network resources is generated by, for example, a CHF entity (e.g., CHF entity 355). As described above, the CHF entity may be a part of another NF entity such as the SMF entity (e.g., SMF 325) and/or a PCF entity (e.g., PCF 345). In this fashion, the CHF entity may be a functional component (e.g., subservice and the like) of the SMF and/or PCF entities. In operation, the CHF entity generally stores CDRs, and generates charging requests based on CDRs and/or entries in CDRs as well as, in some examples, policy information and the like from the PCF entity.

Next, at step 520, the SMF entity selects the BCF based on the received credentials. As mentioned, the credentials data can include identification information indicating an appropriate blockchain service provider with which to interface (and issue payment tokens) for the UE.

At step 525, a charging request is sent to a Blockchain Charging Function (BCF) entity over a blockchain network interface. For example, the blockchain network interface can include the above discussed BCx, BCy, and/or BCz interfaces, which expose one or more blockchain platforms (e.g., enterprise blockchain network, including blockchain service providers or BCFs) to a core network/core NFs (e.g., SBA 132). The charging request causes the BCF entity to perform transactions on specified UE accounts. For example, the BCF entity may debit an account associated with the UE or transfer tokens from the UE account and to another account (e.g., associated with the one or more network resources.) The UE account and/or network resource account may be public accounts (e.g., publically viewable/auditable), private accounts (e.g., requiring authorization to view or audit), or a combination of the two.

At step 530, confirmation of the charge transaction is received from the BCF entity. Then, at step 535, a difference between an amount of the charge transaction and an amount associated with the one or more network resources is determined. The difference is then sent, as a credit, to the BCF entity (step 540.) In some embodiments, the sent credit causes the BCF entity to adjust and/or credit the UE account. The BCF entity may transfer a respective amount of tokens from the network resource account to the UE account. In some examples, such as where a smart contract is associated with the UE account and network resource account, an escrow account controlled by the smart contract may refund back the difference in tokens to the UE account and provide the remaining escrowed tokens to the network resource (e.g., before terminating the completed smart contract.)

In response, and based on the confirmation of the charge transaction, the one or more network resources/services are provided to the UE at step 545. At step 550, procedure 500 may conclude or, in some instances, return to step 505 to perform a new charging procedure.

It should be noted that certain steps within procedure 500 may be optional, and further, the steps shown in FIG. 5 are merely example steps for illustration—certain other steps may be included or excluded as desired. Further, the particular order of the steps is merely illustrative, and it is appreciated that any suitable arrangement of the steps may be utilized without departing from the scope of the embodiments herein.

The techniques described herein, therefore, provide a natively integrated blockchain platform for wireless networks and facilitate provisioning network resources to UE based on distributed blockchain account information. This native blockchain platform supports new use cases that create opportunities to share network resources across multiple provider networks, increase workload mobility security, improve billing/mediation and reconciliation and create mechanisms for roaming authentication/registration using blockchain technology. In addition, the native blockchain platform provides new opportunities for the app economy and creates a new market place for Mobile Virtual Network Operators (MVNO) participation. As discussed above the native blockchain platform facilitates new methods for provisioning network resources to UE based on a blockchain accounting procedure/transaction using a natively integrated blockchain platform that is exposed to one or more core NFs using Application Program Interface (API) messages. In this fashion, the native blockchain platform can be leveraged to natively facilitate payments for network services as part of blockchain charging events.

While there have been shown and described illustrative embodiments of the native blockchain platform and corresponding operations in a specific network context (e.g., a mobile core network for a 5G network), it is to be understood that various other adaptations and modifications may be made within the spirit and scope of the embodiments herein. For example, the embodiments and operations disclosed herein have been described with respect to certain devices, NFs, interfaces, and systems, however it is appreciated that such embodiments are provided for purposes of example, not limitation and that the blockchain charging techniques disclosed herein can be incorporated as part of existing wireless networks.

The foregoing description has been directed to specific embodiments. It will be apparent, however, that other variations and modifications may be made to the described embodiments, with the attainment of some or all of their advantages. For instance, it is expressly contemplated that the components, elements, and/or operations described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method for providing services to User Equipment in a communication network, the method comprising:
   receiving, by a Session Management Function (SMF) entity, blockchain credentials associated with User Equipment (UE) in the communication network, the blockchain credentials including a blockchain identifier;
   generating, by the SMF entity, an entry in a Charging Data Record (CDR) within a Charging Function (CHF) entity corresponding to one or more network resources;
   selecting a Blockchain Charging Function (BCF) entity from a plurality of BCF entities based on the blockchain identifier;
   sending, by the SMF entity to the CHF entity, a charging request based on the CDR to over a blockchain network interface, the charging request including the blockchain credentials and a charge transaction for provisioning the one or more network resources;
   modifying, by the CHF, the received charging request based on one or more policy rules associated with the UE to form a modified charging request;
   sending, by the CHF to the BCF entity, the modified charging request;
   receiving, by the SMF entity, a confirmation of the charge transaction from the BCF entity; and
   provisioning the one or more network resources for the UE based on the confirmation of the charge transaction.

2. The method of claim 1, wherein the charge transaction includes an amount corresponding to the one or more network resources, and wherein the confirmation of the charge transaction indicates a deduction by the amount in an account associated with the UE.

3. The method of claim 1, wherein the charge transaction includes an amount corresponding to the one or more network resources, and wherein sending the charging request further comprises initiating, by the SMF entity, a transfer of the amount in tokens from a first account associated with the blockchain credentials to a second account associated with a provider of the one or more network resources.

4. The method of claim 1, wherein the one or more network resources are associated with a first amount, the method further comprising:
   determining, by the SMF entity, a difference between the first amount associated with the one or more network resources and a second amount indicated by the charge transaction;
   sending, by the SMF entity, a credit corresponding to the difference to the BCF entity to cause the BCF entity to adjust an account associated with the UE.

5. The method of claim 1, wherein the confirmation of the charge transaction corresponds to a smart contract.

6. The method of claim 1, wherein sending the charging request based on the CDR further causes the BCF entity to authenticate the blockchain credentials and deduct an amount corresponding to the one or more network resources in an account associated with the UE.

7. The method of claim 1, further comprising:
   requesting, by the CHF entity, the one or more policy rules from a user policy function network repository function (NRF) entity; and
   receiving, by the CHF entity, the one or more policy rules from the NRF entity.

8. The method of claim 1, wherein the charge transaction is associated with an account for a user of the UE, wherein the account is further associated with at least one of a public blockchain or a private blockchain.

9. A network function (NF) device, comprising:
   one or more network interfaces to communicate within a communication network;
   a processor coupled to the network interfaces and adapted to execute one or more processes; and
   a memory configured to store instructions executable by the processor, the instructions when executed operable to:
      receive, by a Session Management Function (SMF) entity, blockchain credentials associated with User Equipment (UE) in the communication network, the blockchain credentials including a blockchain identifier;
      generate, by the SMF entity, an entry in a Charging Data Record (CDR) within a Charging Function (CHF) entity, the charging entry corresponding to one or more network resources;
      select a Blockchain Charging Function (BCF) entity from a plurality of BCF entities based on the blockchain identifier;
      send, by the SMF entity to the CHF entity, a charging request based on the CDR over a blockchain network interface, the charging request including the blockchain credentials and a charge transaction for provisioning the one or more network resources;
      modify, by the CHF, the received charging request based on one or more policy rules associated with the UE to form a modified charging request; and
      send, by the CHF to the BCF entity, the modified charging request;
      receive, by the SMF entity, a confirmation of the charge transaction from the BCF entity; and
      provision the one or more network resources to the UE based on the confirmation of the charge transaction.

10. The NF device of claim 9, the charge transaction includes an amount corresponding to the one or more network resources, and wherein the confirmation of the charge transaction indicates a deduction by the amount in an account associated with the UE.

11. The NF device of claim 10, wherein the instructions, when executed by the processor, are further operable to transfer, by the BCF entity, the amount in tokens from a first account associated with the blockchain credentials to a second account associated with a provider of the one or more network resources.

12. The NF device of claim 9, wherein the confirmation of the charge transaction corresponds to a smart contract.

13. A tangible, non-transitory, computer-readable media having instructions encoded thereon, the instructions, when executed by a processor, are operable to:
   receive, by a Session Management Function (SMF) entity, blockchain credentials associated with User Equipment (UE) in a communication network, the blockchain credentials including a blockchain identifier;
   generate, by the SMF entity, an entry in a Charging Data Record (CDR) within a Charging Function (CHF) entity corresponding to one or more network resources;
   select a Blockchain Charging Function (BCF) entity from a plurality of BCF entities based on the blockchain identifier;
   send, by the SMF entity to the CHF entity, a charging request based on the CDR to a Blockchain Charging Function (BCF) entity over a blockchain network interface, the charging request including the blockchain credentials and a charge transaction for provisioning the one or more network resources;
   modify, by the CHF, the received charging request based on one or more policy rules associated with the UE to form a modified charging request; and
   send, by the CHF to the BCF entity, the modified charging request;
   receive, by the SMF entity, a confirmation of the charge transaction from the BCF entity; and
   provision the one or more network resources to the UE based on the confirmation of the charge transaction.

14. The tangible, non-transitory, computer-readable media of claim 13, wherein the charge transaction includes an amount corresponding to the one or more network resources, and wherein the confirmation of the charge transaction indicates a deduction by the amount in an account associated with the UE.

15. The tangible, non-transitory, computer-readable media of claim 14, wherein the instructions, when executed by the processor, are further operable to transfer, by the BCF entity, the amount in tokens from a first account associated with the blockchain credentials to a second account associated with a provider of the one or more network resources.

* * * * *